United States Patent
Soules et al.

(10) Patent No.: US 7,823,156 B2
(45) Date of Patent: Oct. 26, 2010

(54) METHOD OF HASHING ADDRESS SPACE TO STORAGE SERVERS

(75) Inventors: Craig Soules, Pittsburgh, PA (US); Arif Merchant, Los Altos, CA (US); Alistair C. Veitch, Mountain View, CA (US); Yasushi Saito, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1647 days.

(21) Appl. No.: 11/051,436

(22) Filed: Feb. 3, 2005

(65) Prior Publication Data

US 2006/0236073 A1  Oct. 19, 2006

(51) Int. Cl.
- G06F 9/46 (2006.01)
- G06F 15/16 (2006.01)
- G06F 15/173 (2006.01)
- G06F 12/00 (2006.01)

(52) U.S. Cl. .................. 718/105; 718/104; 709/219; 709/226; 711/216

(58) Field of Classification Search ................. 711/114, 711/202, 216; 709/223; 718/105, 104
See application file for complete search history.

(56) References Cited

U.S. PATENT DOCUMENTS

| | | | |
|---|---|---|---|
| 5,544,318 A | 8/1996 | Schmitz et al. | |
| 5,740,465 A | 4/1998 | Matsunami et al. | |
| 6,415,372 B1 | 7/2002 | Zakai et al. | |
| 6,418,510 B1 | 7/2002 | Lamberts | |
| 6,601,084 B1* | 7/2003 | Bhaskaran et al. | 718/105 |
| 6,912,585 B2* | 6/2005 | Taylor et al. | 709/231 |
| 6,922,724 B1* | 7/2005 | Freeman et al. | 709/223 |
| 7,085,271 B2* | 8/2006 | Gooch | 370/392 |
| 7,231,445 B1* | 6/2007 | Aweya et al. | 709/226 |
| 7,266,668 B2* | 9/2007 | Hartung et al. | 711/202 |
| 7,290,168 B1* | 10/2007 | DeKoning | 714/9 |
| 7,546,354 B1* | 6/2009 | Fan et al. | 709/219 |
| 2002/0087783 A1 | 7/2002 | Leonhardt et al. | |
| 2002/0133537 A1 | 9/2002 | Lau et al. | |
| 2002/0184403 A1 | 12/2002 | Dahlin et al. | |
| 2005/0044229 A1 | 2/2005 | Brown et al. | |
| 2006/0174063 A1 | 8/2006 | Soules et al. | |

OTHER PUBLICATIONS

Thomas E. Anderson et al., Serverless Network File Systems, ACM, Inc., New York, NY, 1995.

(Continued)

*Primary Examiner*—Lewis A Bullock, Jr.
*Assistant Examiner*—Tammy Lee

(57) ABSTRACT

An embodiment of a method of hashing an address space to a plurality of storage servers begins with a first step of dividing the address space by a number of the storage servers to form data segments. Each data segment comprises a base address. A second step assigns the data segments to the storage servers according to a sequence. The method continues with a third step of measuring a load on each of the storage servers. According to an embodiment, the method concludes with a fourth step of adjusting data shares assigned to the storage servers according to the sequence to approximately balances the loads on the storage servers while maintaining the base address for each data segment on an originally assigned storage server. According to another embodiment, the method periodically performs the third and fourth steps to maintain an approximately balanced load on the storage servers.

37 Claims, 4 Drawing Sheets

OTHER PUBLICATIONS

Toni Cortes et al., Design Issues of a Cooperative Cache with no Coherence Problems, 1997.

Michael D. Dahlin et al., Cooperative Caching: Using Remote Client Memory to Improve File System Performance, 1994.

Svend Frølund et al., FAB: enterprise storage systems on a shoestring, 2003.

Gregory R. Ganger et al., Self-* Storage: Brick-based storage with automated administration, Aug. 2003.

David Karger et al., Consistent Hashing and Random Trees: Distributed Cashing Protocols for Relieving Hot Spots on the World Wide Web, 1997.

Nimrod Megiddo et al., ARC: A Self-Tuning, Low Overhead Replacement Cache, Proceedings of FAST '03: 2nd USENIX Conference on File and Storage Technologies, pp. 115-130, The USENIX Association, Berkeley, CA, Mar. 31, 2003.

Anoop Ninan et al., Scalable Consistency Maintenance in Content Distribution Networks Using Cooperative Leases, 2003.

Pablo Rodriguez et al., Parallel-Access for Mirror Sites in the Internet, 2000.

Pablo Rodriguez et al., Web Caching Architectures: Hierarchial and Distributed Cashing, Jan. 18, 1999.

Antony Rowstron et al., Storage management and caching in PAST, a large-scale persistent peer-to-peer storage utility, SOSP-18, ACM Press, New York, NY, 2001.

Prasenjit Sarkar et al., Efficient Cooperative Caching using Hints, 1996.

Markus Sinnwell et al., A Cost-Model-Based Online Method for Distributed Caching, 1997.

Ion Stoica et al.,. CHORD: A Scalable Peer-To-Peer Lookup Service for Internet Applications, 2001.

Mohammed Javeed Zaki, et al., Customized Dynamic Load Balancing for a Network of Workstations, Dec. 1995.

Hyde, Randall "Write Great Code" Nov. 2004, No Starch, Chapter 11, Section 11:1, The Memory Hierarchy and Section 11:2 How the Memory Hierarchy Operates (7 pages).

Pei, Cai et al; Cost-Aware WWW Proxy Caching Algorithms, USENIX Symposium on Internet Technologies and Systems, Dec. 1997 (15 pages).

Michael Rabinovich et al, "Not All Hits Are Created Equal: Cooperative Proxy Caching Over a Wide-Area Network," 1998, (pp. 1-10).

Markus Sinnwell, et al, A Cost Model Based Online Method for Distributed Caching, 1997 (10 pages).

U.S. Appl. No. 11/051,435, Examiner's Answers dated Apr. 18, 2008, pp. 1-27 with attachments.

U.S. Appl. No. 11/051,435, Office Action dated Mar. 13, 2007, pp. 1-19 with attachments.

U.S. Appl. No. 11/051,435, Office Action dated Jun. 28, 2007, pp. 1-22.

* cited by examiner

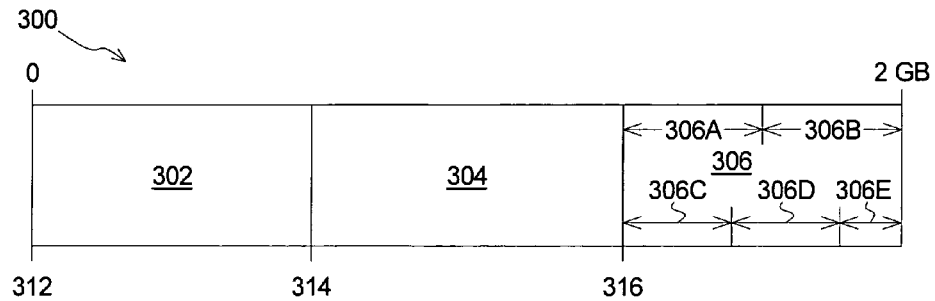
FIG. 3
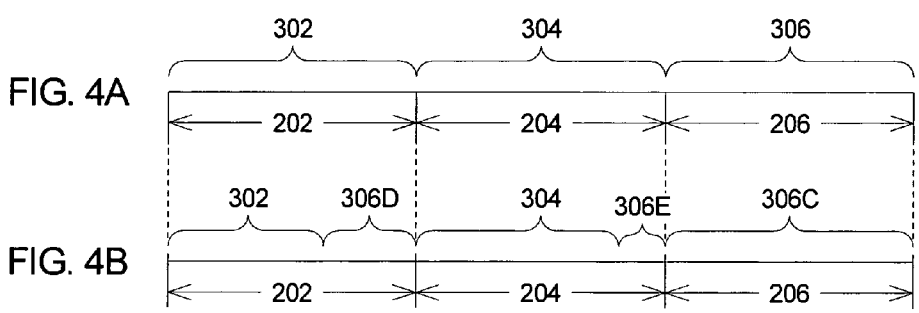
FIG. 4A
FIG. 4B
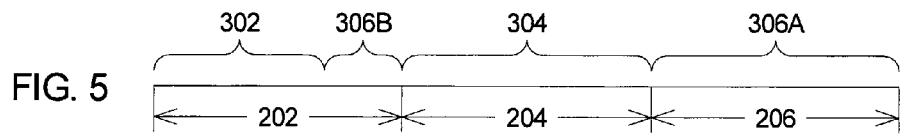
FIG. 5
| Table 1 | |
|---|---|
| Replica Sets | Storage Devices |
| 1st Replica Set | 603, 605, 607 |
| 2nd Replica Set | 601, 606, 608 |
| 3rd Replica Set | 604, 605, 606 |
| 4th Replica Set | 602, 606, 607 |
| 5th Replica Set | 603, 604, 608 |
| 6th Replica Set | 607, 608, 609 |
| 7th Replica Set | 601, 602, 603 |
| 8th Replica Set | 601, 605, 609 |
| 9th Replica Set | 602, 605, 608 |
| 10th Replica Set | 603, 606, 609 |
| 11th Replica Set | 602, 604, 609 |
| 12th Replica Set | 601, 604, 607 |
FIG. 7

METHOD OF HASHING ADDRESS SPACE TO STORAGE SERVERS

RELATED APPLICATIONS

This application is related to U.S. Ser. No. 11/051,435, U.S. Publication No. 2006/0174063, filed on Feb. 3, 2005, the contents of which are hereby incorporated by reference.

FIELD OF THE INVENTION

The present invention relates to the field of data storage. More particularly, the present invention relates to the field of data storage where a hashing technique improves performance of storage servers.

BACKGROUND OF THE INVENTION

A critical component of computer systems is data storage. Data storage can be divided conceptually into an individual user's data storage, which is attached directly to the individual's computer, and network based data storage typically intended for multiple users.

One type of network based storage device is a disk array. The disk array includes a controller coupled to an array of disks. Typically, components (e.g., the controller and the disks) of the disk array are hot swappable, which allows components to be replaced without turning off the disk array.

As an alternative to the disk array, researchers have been exploring data storage within a distributed storage system which includes an array of independent storage devices coupled together by a network. Each of the independent storage devices includes a processor, memory, and one or more disks. An advantage of the array of independent storage devices is lower cost. The lower cost can result from mass production of the independent storage devices as commodity devices and from elimination of hot swappable features of the disk array. Another advantage is better scalability. The user can buy a few devices initially and add more devices as demand grows.

Replication and erasure coding have been explored as techniques for enhancing reliability for an array of independent storage devices. A replication technique employed by the array of independent storage devices replicates data blocks across a set of storage devices (e.g., three storage devices). This set is called the replica set for the data blocks. Erasure coding stores m data blocks and p parity blocks across a set of n storage devices, where n=m+p. For each set of m data blocks that is striped across a set of m storage devices, a set of p parity blocks is stored on a set of p storage devices.

If a high speed network couples the independent storage devices of a distributed storage system together, disk access latency can cause a significant delay when a client reads data. Memory provides a faster access latency than disk storage. If a replicated or erasure coded address space could be hashed to the storage devices, each memory could cache its portion of the replicated or erasure coded address space eliminating duplicates among the caches of different storage devices. More generally, it would be desirable to be able to hash an address space to a plurality of storage servers.

What is needed is a method of hashing an address space to a plurality of storage servers.

SUMMARY OF THE INVENTION

The present invention comprises a method of hashing an address space to a plurality of storage servers. According to an embodiment, the method begins with a first step of dividing the address space by a number of the storage servers to form data segments. Each data segment comprises a base address. A second step assigns the data segments to the storage servers according to a sequence. The method continues with a third step of measuring a load on each of the storage servers. In an embodiment, the method concludes with a fourth step of adjusting data shares assigned to the storage servers according to the sequence to approximately balance the loads on the storage servers while maintaining the base address for each data segment on an originally assigned storage server. In another embodiment, the method periodically performs the third and fourth steps to maintain an approximately balanced load on the storage servers.

These and other aspects of the present invention are described in more detail herein.

BRIEF DESCRIPTION OF THE DRAWINGS

The present invention is described with respect to particular exemplary embodiments thereof and reference is accordingly made to the drawings in which:

FIG. 3 schematically illustrates an address space that is hashed according to an embodiment of a method of the present invention;

FIG. 4A graphically illustrates an assignment of data segments to storage devices according to an embodiment of a method of hashing an address space of the present invention;

FIG. 4B graphically illustrates an adjustment of data segments assigned to storage devices according to an embodiment of a method of hashing an address space of the present invention;

FIG. 5 graphically illustrates an alternative assignment of data segments to storage devices according to an embodiment of a method of hashing an address space of the present invention;

FIG. 7 is a table which shows a permutation of a logical unit into logical unit segments which are assigned to replica sets of three storage devices according to an embodiment of a method of hashing an address space of the present invention.

DETAILED DESCRIPTION OF A PREFERRED EMBODIMENT

The present invention comprises a method of hashing an address space to a plurality of storage servers. In an embodiment, the storage servers comprise a distributed storage system in which each storage server comprises a storage device. In such an embodiment, the method of hashing the address space determines a cooperative caching state for the storage devices. The cooperative caching state is discussed more fully below.

Figure 1:
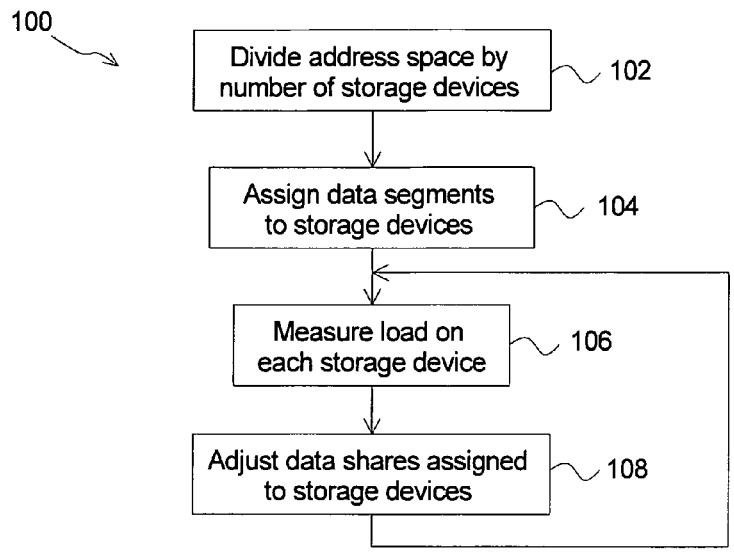
FIG. 1 illustrates an embodiment of a method of hashing an address space to a plurality of storage servers of the present invention as a flow chart.

An embodiment of the method of hashing the address space to a plurality of storage devices (i.e., storage servers) is illustrated as a flow chart in FIG. 1. According to an embodiment, the method 100 begins with a first step 102 of dividing the address space by a number of the storage devices. This forms data segments. Each data segment comprises a base address.

Figure 2:
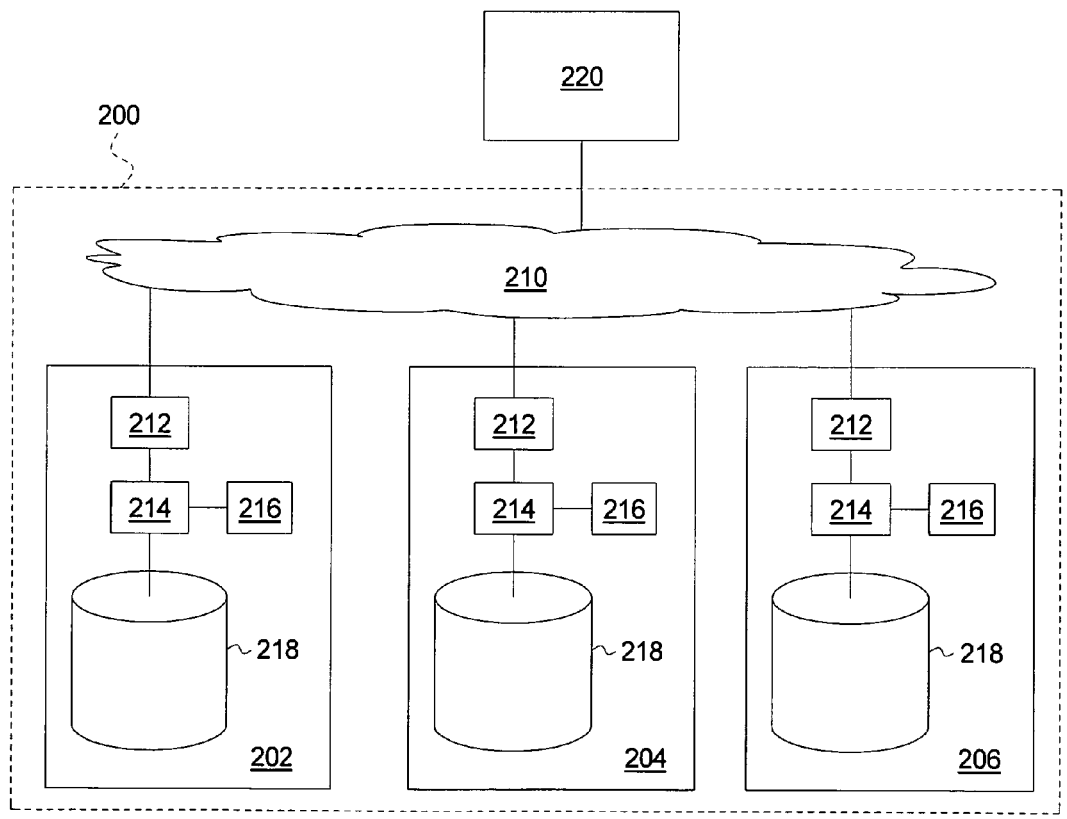
FIG. 2 schematically illustrates a distributed storage system which employs an embodiment of a method of hashing an address space to a plurality of storage devices of the present invention.

An embodiment of a distributed storage system which employs the method of hashing the address space is schematically illustrated in FIG. 2. In an embodiment, the distributed storage system 200 comprises first through third storage devices, 202 . . . 206, which are coupled together by a network 210. In other embodiments, the distributed storage system comprises more or less of the storage devices (e.g., two storage devices, thousands of storage devices, etc.). Each of the first through third storage devices, 202 . . . 206, comprises a network interface 212, a processor 214, memory 216, and a storage media 218, which are coupled together. Preferably, the memory 216 comprises VRAM (volatile random access memory) used for read caching and NVRAM (non-volatile random access memory) used for write caching. Alternatively, the memory 216 comprises another memory configuration. Preferably, each storage media 218 comprises one or more disks. Alternatively, the storage media 218 within one or more of the first through third storage devices, 202 . . . 206, comprises some other storage media such as a tape.

Other embodiments of distributed storage systems which may employ the method 100 of cooperative caching of the present invention include web servers, database systems, storage systems using RAM and extended FLASH memories, distributed tape, multi-tier storage systems, parallel file servers, and other distributed storage systems that include two or more levels of storage (e.g., a memory level and a disk level, or a disk level and a tape level) in which a faster storage level performs caching.

In an embodiment, the first through third storage devices, 202 . . . 206, store replicated data. Here, each of the first through third storage devices, 202 . . . 206, stores an entire address space. In operation, a client 220, which is coupled to the network 210, contacts one of the first through third storage devices, 202 . . . 206, with a read request for data. Alternatively, the client 220 couples to the storage device by way of another network (not shown). The contacted storage device then parses the read request for the data according to a cooperative caching state. For example, first data blocks are requested from the first storage device 202, second data blocks are requested from the second storage device 204, and third data blocks are requested from the third storage device 206. Here, the first data blocks comprise a portion of a first data share, the second data blocks comprise a portion of a second data share, and the third data blocks comprise a portion of a third data share. The first through third data shares are determined by the method of hashing the address space of the present invention.

The cooperative caching state comprises the first through third data shares assigned to the first through third storage devices, 202 . . . 206. According to an embodiment, the first through third data shares initially comprise equal assignments of an address space. As time proceeds, the method of hashing the address space adjusts the data shares in accordance with loads experienced by the first through third storage devices, 202 . . . 206. This balances the loads experienced by the first through third storage devices, 202 . . . 206, while improving a response time for read requests parsed to the first through third storage devices, 202 . . . 206.

Each of the first through third storage devices employs a local caching policy. According to an embodiment, the local caching policy comprises an LRU (least recently used) caching policy. According to other embodiments, the local caching policy comprises a least frequently used caching policy, a random caching policy, a FIFO (first-in-first-out) caching policy, an ARC (adaptive replacement caching) policy, or another caching policy. In an embodiment, the local caching policy determines whether the data blocks requested from a particular storage device reside in the memory 216 (i.e., a cache memory).

If the data blocks requested from the particular storage device reside in the memory 216, the particular storage device provides the data blocks to the client 220 from the memory 216. Such a response is characterized as a cache hit. If one or more of the data blocks requested from the particular storage device do not reside in the memory 216, the particular storage device provides missing data blocks from storage. Such a response is characterized as a cache miss. Providing the data blocks from the storage is slower than providing the data blocks from the memory 216. Thus, it is desirable to provide the data blocks from the memory 216 rather than the storage. In other words, it is desirable to improve a cache hit ratio, which is a ratio of cache hits to total requests of the particular storage device.

The method of hashing the address space of the present invention in conjunction with the local caching policy provides a cooperative caching technique for the first through third storage devices, 202 . . . 206, which balances a load across the first through third storage devices, 202 . . . 206, while improving the cache hit ratio.

In an invocation of a method of hashing the address space of the present invention, one of the first through third storage devices, 202 . . . 206, acts as a coordinator of the method. Alternatively, the client 220 or another computer coupled to the network 208 acts as the coordinator. Initially, the coordinator hashes equal data shares to each of the first through third storage devices, 202 . . . 206.

An address space hashed according to the method 100 (FIG. 1) is schematically illustrated in FIG. 3. According to an embodiment, the first step 102 (FIG. 1) divides the address space 300 by three according to a number of the first through third storage devices, 202 . . . 206 (FIG. 2). This forms first through third data segments, 302 . . . 306. Each of the first through third data segments, 302 . . . 306, comprises a base address. In an embodiment, the base addresses comprise first through third base addresses, 312 . . . 316.

For example, the address space 300 may comprise a 6 GB address space, in which case the first through third data segments, 302 . . . 306, each comprise 2 GB. The address space 300 may comprise data blocks. For example, the data blocks may comprise 1 kB each.

The method 100 (FIG. 1) continues with a second step 104 of assigning the first through third data segments, 302 . . . 306 (FIG. 3), to the first through third storage devices, 202 . . . 206 (FIG. 2), respectively. The assignment of data segments follows an assignment sequence which is known to any coordinator of the method 100. According to an embodiment, the assignment sequence uses IP (internet protocol) addresses where a lowest IP address number begins the assignment sequence and others in the assignment sequence are determined by ascending IP address numbers. Thus, any coordinator will assign the first through third data segments, 302 . . . 306, to the first through third storage devices, 202 . . . 206, respectively. Alternatively, any way of determining a unique sequence among the first through third storage devices, 202 . . . 206, will suffice. This may be determined by an administrator or may be dependent upon a network technology or a hardware technology (e.g., a manufacturer supplied unique identifier).

It will be readily apparent to one skilled in the art that the term "assignment sequence" in the context of the present invention refers to a repeatable assignment and not an order of assignment. Accordingly, the second data segment 304 may be assigned to the second storage device 204 prior to the first data segment 302 being assigned to the first storage device 202.

An initial assignment of the first through third data segments, 302 . . . 306, to the first through third storage devices, 202 . . . 206, is graphically illustrated in FIG. 4A. FIG. 4A graphically depicts the first through third storage devices, 202 . . . 206, below an axis while graphically depicting the first through third data segments, 302 . . . 306, above the axis. As can be seen, each of the first through third storage devices, 202 . . . 206, has an initial assignment of one and only one of the first through third data segments, 302 . . . 306. Also, as can be seen, the first through third base addresses, 312 . . . 316, reside on the first through third storage devices, respectively.

Each of the first through third storage devices holds a data share. The data share held by each of the first, second, and third storage devices, 202 . . . 206, is a portion of the address space which the first, second, or third storage device, respectively, will respond to read requests. The data share may be expressed as a percentile (e.g., 0.9, 1.0, and 1.1) or as a percentage (90%, 100%, and 110%). Initially, the data shares held by the first through third storage devices, 202 . . . 206, comprise equal data shares. Expressing the data shares as percentages, each of the first through third storage devices, 202 . . . 206, holds a 100% share of the first through third data segments, 302 . . . 306, respectively.

An alternative initial assignment of the first through third data segments, 302 . . . 306, to the first through third storage devices, 202 . . . 206, is graphically illustrated in FIG. 5. In the alternative assignment, 150%, 100%, and 50% data shares are assigned to the first through third storage devices, 202 . . . 206. Each of the first through third base addresses, 312 . . . 316, reside on the first through third storage devices, 202 . . . 206, respectively. The first data segment 302 resides on the first storage device 202 in its entirety since the first storage device 202 has a data share that exceeds 100% (i.e., 150%). The second data segment 304 resides on the second storage device 204 in its entirety since the second storage device has a data share that equals 100%. However, only a 50% portion 306A of the third data segment 306 resides on the third storage device 206 since the third storage device has a data share that is less than 100% (i.e., 50%). A 50% remainder 306B of the third data segment 306 greedily fills available data shares on other storage devices according to the assignment sequence. Accordingly, the 50% remainder 306A is assigned to the first storage device 202.

The method 100 (FIG. 1) continues with a third step 106 of measuring a load on each of the first through third storage devices, 202 . . . 206 (FIG. 2). According to an embodiment, a load on a storage device comprises a number of outstanding disk read requests. According to another embodiment, a load on a storage device comprises a weighted sum of a number of outstanding memory read requests and a number of outstanding disk read requests. According to another embodiment, a load on a storage device comprises a weighted sum of a number of outstanding memory read or write requests, a number of outstanding transfers from a write memory to disk, and a number of outstanding disk read requests. According to another embodiment, a load on a storage device further comprises a weighted number of outstanding timestamp requests. According to an embodiment, a load on a storage device comprises:

$$\text{load} = 0.3 \cdot T + C + 5 \cdot D + 10 \cdot V$$

where T is the number of outstanding timestamp requests, C is the number of outstanding memory read or write requests, D is the number of outstanding disk read requests, and V is the number of outstanding transfers from a write memory to disk.

In another embodiment, a load on a storage device is an average response time of the storage device. For example, the average response time to read requests during a preceding time interval. The load redistribution from this embodiment may lead to uniform response times for heterogeneous devices.

In an embodiment, a cumulative load is determined by periodically saving an instantaneous load and then summing over a number of time periods. For example, each of the first though third storage devices, 202 . . . 206, may measure and save its instantaneous load every 0.2 sec. and sum the saved instantaneous loads every 5 sec. In another embodiment, the cumulative load is determined using exponential averaging, which gives exponentially lower weights to older instantaneous loads.

In an embodiment, following the initial assignment of the first through third data segments, 302 . . . 306, to the first through third storage devices, 202 . . . 206, as graphically depicted in FIG. 4A, the first through third storage devices, 202 . . . 206, measure cumulative loads of 60%, 80%, and 160%, which are transmitted to the coordinator along with existing data shares (i.e., 100% data shares for each initially).

According to an embodiment, the method 100 continues with a fourth step 108 of adjusting the data shares assigned to the first through third storage devices, 202 . . . 206, according to the assignment sequence. The adjustment of the data shares approximately balances the loads on the first through third storage devices, 202 . . . 206, while maintaining the first through third base addresses, 312 . . . 316, on the first through third storage devices, 202 . . . 206, respectively.

In an embodiment, the coordinator determines the adjustment by calculating a new data share share$_{i+1}$ for an (i+1)th time interval for each of the first through third storage devices, 202 . . . 206, according to:

$$\text{share}_{i+1} = \text{share}_i + \frac{avg.\text{load} - \text{load}}{D}$$

where share$_i$ is the data share for the ith time interval, load is the load determined in the third step 106, avg. load is the average load (100%), and D is a damping factor. The damping factor assures convergence on a balanced load where the first through third storage devices, 202 . . . 206, have different processing capacities or memory capacities. For example, if the third storage device 206 has a slower processing capacity compared to the first and second storage devices, 202 and 204, using a damping factor of 2 may avoid oscillating between over-loading and under-loading the third storage device 206.

According to an embodiment in which the first through third storage devices, in which the damping factor D is set to 1, in which the previous assignment of data shares is 100% for each of the first through third storage devices, 202 . . . 206, and in which the third step 106 determines the cumulative loads for the first through third storage devices, 202 . . . 206, as 60%, 80%, and 160%, the fourth step 108 determines new data shares for the first through third storage devices, 202 . . . 206, as 160%, 120%, and 40%. The fourth step 108 then adjusts the third data segment 306 by maintaining an assignment of a first 40% of the third data segment 306 on the third storage device, reassigning a next 40% of the third data segment 306 to the first storage device 202, and reassigning a remaining 20% of the third data segment 306 to the second storage device 204.

The new assignment of the third data segment is graphically illustrated in FIG. 4B. Assignment of the third data segment 306 has been reassigned according to the first, second, and third portions, 306C, 306D, and 306E which represent the first 40%, the next 40%, and the remaining 20% of the third data segment 306, respectively.

According to an embodiment, the method continues with a periodic instantiation of the third and fourth steps, 106 and 108. For example, the periodic instantiation of the third and fourth steps, 106 and 108, may occur every 5 sec.

In an embodiment, the coordinator maintains existing data shares for the first through third storage devices, 202 . . . 206, so that when contacted with a read request from the client 220, the coordinator can parse the read request accordingly. In another embodiment, where multiple computers can act as the coordinator, the data shares for the first through third storage devices, 202 . . . 206, and the cumulative loads for the first through third storage devices, 202 . . . 206, are sent to the multiple computers so that when any of the multiple computers receive a read request, the coordinator will consistently parse the read request according to the data shares determined in a latest instantiation of the fourth step 108.

According to an alternative embodiment, the first step 102 is preceded by a step of permuting an initial address space to form the address space which is hashed by the method 100.

According to an alternative embodiment, the data comprises a stripe of erasure coded data. Each stripe comprises stripe blocks and parity blocks. For example, each stripe may comprise three stripe blocks and two parity blocks. To read such a stripe a coordinator needs to receive any three of the five data blocks. If the coordinator receives the three stripe blocks, the coordinator or a client need do no further processing to use the data. If the three data blocks include at least one of the parity blocks, the coordinator or the client must decode the data.

Figure 6:
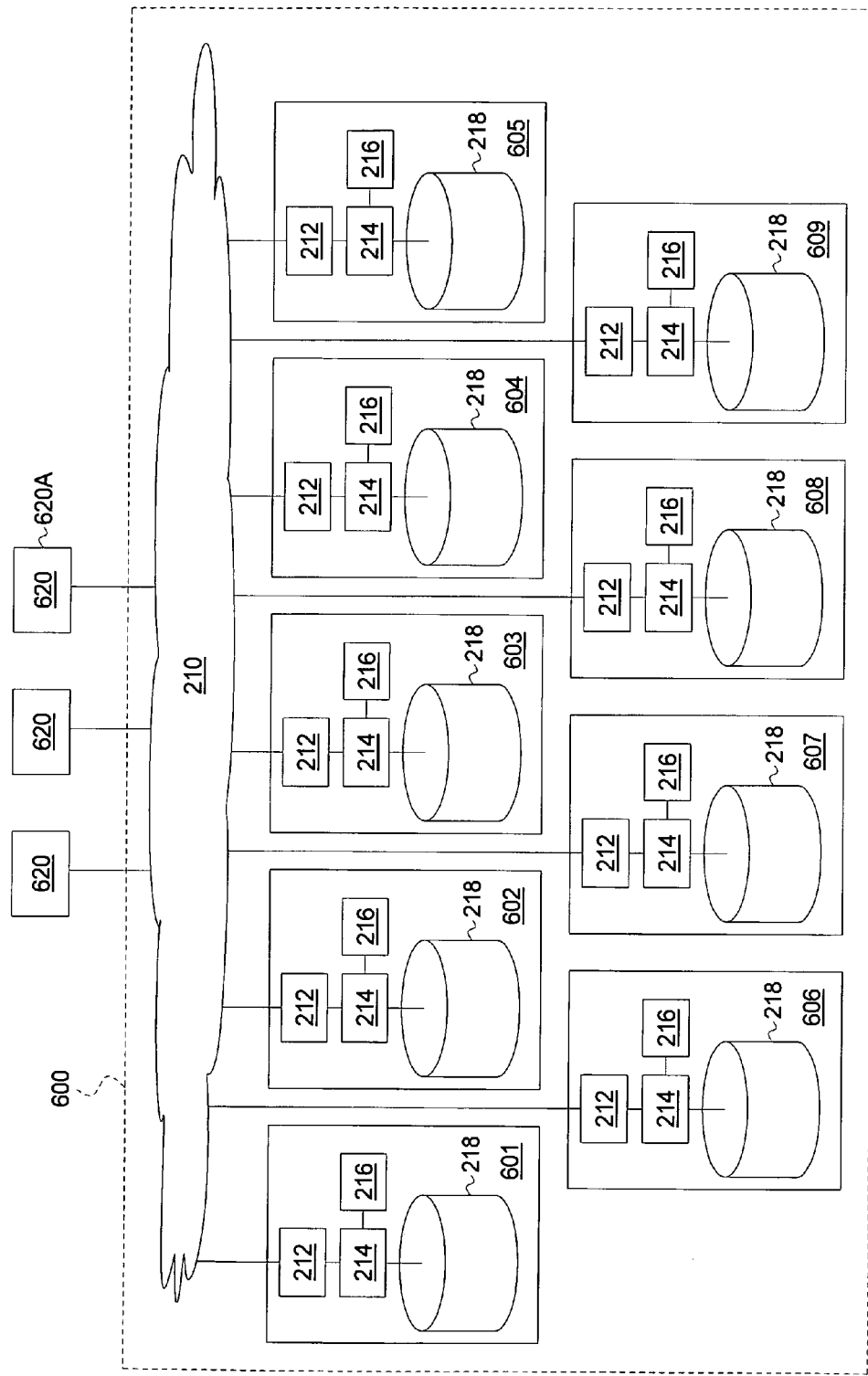
FIG. 6 schematically illustrates a distributed storage system which implements an embodiment of a method of hashing an address space to a plurality of storage devices of the present invention.

An alternative embodiment of a distributed storage system which employs the method of hashing the address space is schematically illustrated in FIG. 6. According to an embodiment, the distributed storage system 600 comprises first through ninth storage devices, 601 . . . 609, which are coupled together by the network 210. Each of the first through ninth storage devices, 601 . . . 609, comprises the network interface 212, the processor 214, the memory 216, and the storage media 218, which are coupled together.

According to an embodiment, the first through ninth storage devices, 601 . . . 609, cooperate to present clients 620 with a logical unit. The logical unit is split into a number of logical unit segments. For example, each logical unit segment may comprise 64 MB. Alternatively, the logical unit segments may comprise another size.

In an embodiment, the first through ninth storage devices, 601 . . . 609, store replicated data where each logical unit segment is replicated across a subset of the first through ninth storage devices, 601 . . . 609. Each subset of the first through ninth storage devices, 601 . . . 609, comprise a replica set. In such an embodiment, the logical unit is replicated across replica sets. In an embodiment, each replica set comprises three of the first through ninth storage devices, 601 . . . 609. In another embodiment, each replica set comprises another number of the first through ninth storage devices, 601 . . . 609. In an embodiment, the distributed storage system 600 forms first through twelfth replica sets pseudo-randomly, with each of the first through ninth storage devices, 601 . . . 609, belonging to approximately 4 of the replica sets.

An embodiment of a mapping of the first through ninth storage devices, 601 . . . 609, to the first through twelfth replica sets is listed in Table 1, which is provided as FIG. 7. Each of the first through twelfth replica sets comprise three of the first through ninth storage devices, 601 . . . 609. The first replica set comprises the third, fifth, and seventh storage devices 603, 605, and 607. The second replica set comprises first, sixth, and eighth storage devices, 601, 606, and 608. The third replica set comprises the fourth, fifth, and sixth storage devices, 604, 605, and 606. The fourth through twelfth replica sets are listed in Table 1.

According to such a mapping, the logical unit for the first through ninth storage devices, 601 . . . 609, is permuted across the first through twelfth replica sets to form a permutation of the logical unit. According to the permutation, an address space for the first storage device 601 holds a first logical unit segment, a thirteenth logical unit segment, a twenty-fifth logical unit segment, etc.

Figure 8:
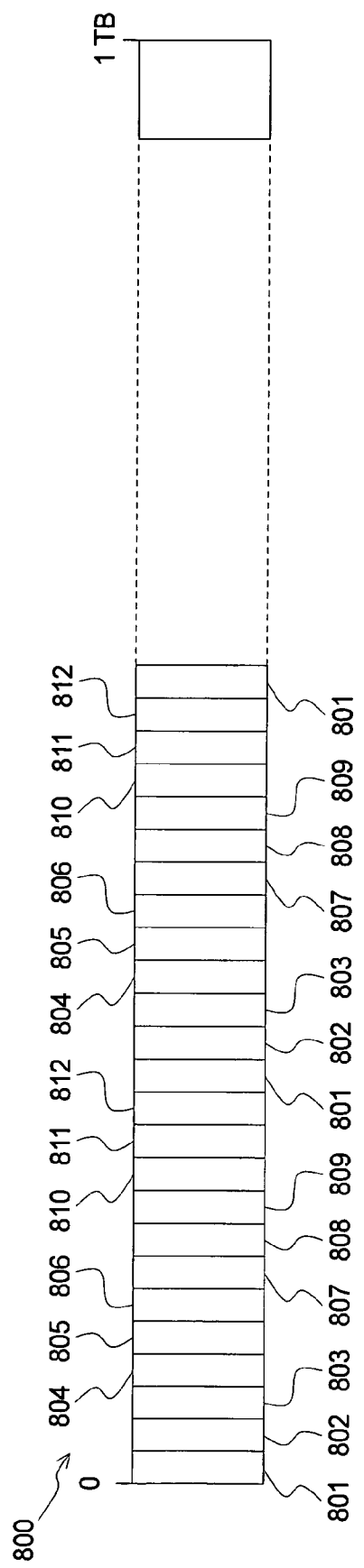
FIG. 8 schematically illustrates a permutation of a logical unit into logical unit segments which are assigned to replica sets of three storage devices according to an embodiment of a method of hashing an address space of the present invention.

FIG. 8 schematically illustrates the permutation of the logical unit 800 (e.g., 1 TB) across the first through twelfth replica sets, 801 . . . 812. By permuting the logical unit, it is more likely that hot spots (i.e., frequently accessed data) will be dispersed among the first through twelfth replica sets, 801 . . . 812.

In order to obviate a need for centralized request routing, the distributed storage system 600 replicates the mapping of first through ninth storage devices, 601 . . . 609, to the first through twelfth replica sets, 801 . . . 812, across the first through ninth storage devices, 601 . . . 609. By replicating the mapping across the first through ninth storage devices, 601 . . . 609, any of the first through ninth storage devices, 601 . . . 609, can act as a coordinator of a read or write request.

According to an embodiment, first through twelfth hashing coordinators perform the method 100 (FIG. 1) for the first through twelfth replica sets, 801 . . . 812, respectively. According to such an embodiment, the first hashing coordinator performs the method 100 for the first replica set 801, the second hashing coordinator performs the method 100 for the second replica set 802, etc. Alternatively, some other number of coordinators perform the method 100 for the first through twelfth replica sets, 801 . . . 812. For example, a single coordinator may perform the method 100. Alternatively, a coordinator that is routing a read request may perform the method as part of routing the read request.

Initially, the first through twelfth hashing coordinators performs the step 102 of dividing each of first through twelfth address spaces for the first through twelfth replica sets, 801 . . . 812, into three data segments. In the second step 104, the three data segments of each of the first through twelfth replica sets, 801 . . . 812, are sequentially assigned to the three storage devices which make up the replica set. For the first replica set 801, a first data segment is assigned to the third storage device 603, a second data segment is assigned to the fifth storage device 605, and a third data segment is assigned to the seventh storage device 607. Other assignments of the three data segments of the second through twelfth replica sets, 802 . . . 812, take place similarly. These initial assignments of the three data segments to the first through twelfth replica sets, 80 . . . 812, define initial first through twelfth cooperative caching states for the first through twelfth replica sets, 801 . . . 812, respectively.

The first through twelfth hashing coordinators periodically perform the third and fourth steps, 106 and 108, of the method 100 to adjust the first through twelfth cooperative caching states (i.e., the data shares assigned to each of the storage devices within a replica set). The first through twelfth hashing coordinators broadcast the cooperative caching states to others of the first through ninth storage devices, 601 . . . 609.

In an embodiment, when a client 620A issues a write request, the client 620A randomly chooses one of the first through ninth storage devices, 601 . . . 609, to act as the coordinator. The coordinator determines which of the first through twelfth replica sets, 801 . . . 812, replicate the data. The coordinator runs two-phase voting to ensure that data is written to at least a majority of a replica set using timestamps for data blocks to resolve conflicts.

In an embodiment, when a client 620A issues a read request, the client 620A randomly chooses one of the first through ninth storage devices to act as the coordinator. The coordinator determines which of the first through twelfth replica sets, 801 . . . 812, replicates the data. The coordinator requests the data from one or more of the storage devices within the replica set according to the cooperative caching state of the replica set.

The coordinator runs a recovery protocol when the timestamps do not match, but this happens only after a storage device recovers from a crash. Such failures are expected to be rare.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of hashing an address space to a plurality of storage servers comprising the steps of:
    dividing the address space by a number of the storage servers to form data segments, each data segment comprising a base address;
    assigning the data segments to the storage servers;
    measuring a load on each of the storage servers, wherein measuring the load on each of the storage servers comprises computing a weighted aggregate of outstanding read and write requests, wherein the load comprises a cumulative load which comprises an aggregate of an instantaneous load taken at time intervals over a time period;
    adjusting data shares assigned to the storage servers to approximately balance the loads on the storage servers while maintaining the base address for each data segment on a corresponding originally assigned storage server, wherein adjusting the data share for each of the storage servers comprises calculating an adjusted data share for each of the storage servers based on an existing data share of the corresponding storage server, and on the load of the corresponding storage server; and
    moving at least a portion of at least one of the data segments between the storage servers in response to adjusting the data shares.

2. The method of claim 1 further comprising repeatedly performing the steps of measuring the load on each of the storage servers and adjusting the data shares assigned to the storage servers to maintain approximately balanced loads on the storage servers.

3. The method of claim 1 further comprising the step of permuting an initial address space to form the address space.

4. The method of claim 1 wherein each data segment further comprises a plurality of data blocks.

5. The method of claim 4 wherein the moving comprises moving first data blocks from a first over-utilized storage server to a first under-utilized storage server.

6. The method of claim 5 wherein the first data blocks comprise an upper end of the at least one data segment.

7. The method of claim 6 wherein a remainder of the at least one data segment comprises second data blocks and further wherein the second data blocks comprise a particular data block which resides at the base address for the at least one data segment.

8. The method of claim 4 wherein the moving comprises moving first data blocks from a first over-utilized storage server to first and second under-utilized storage servers.

9. The method of claim 1 wherein the step of measuring the load on each of the storage servers comprises summing and weighting:
    a number of outstanding cache-read requests;
    a number of outstanding cache-write requests;
    a number of outstanding disk-read requests; and
    a number of outstanding disk-write requests.

10. The method of claim 9 wherein the step of measuring the load on each of the storage servers further comprises summing and weighting a number of outstanding time-stamp requests.

11. The method of claim 1 wherein the step of measuring the load on each of the storage servers further comprises measuring a response time of each of the storage servers.

12. The method of claim 1 wherein the aggregate of the instantaneous load comprises an averaged sum of the instantaneous load taken at time intervals over the time period.

13. The method of claim 1 wherein the aggregate of the instantaneous load comprises a cumulative load which is generated through exponential averaging of instantaneous loads taken at time intervals over the time period.

14. The method of claim 1 wherein a coordinator coordinates the steps of:
    dividing the address space into the data segments;
    assigning the data segments;
    measuring the load on each of the storage servers; and
    adjusting the data shares assigned to the storage servers.

15. The method of claim 14 wherein the storage servers communicate the loads to the coordinator by appending load information onto messages.

16. The method of claim 14 wherein the storage servers communicate the loads to the coordinator by broadcasting load information.

17. The method of claim 1 wherein the storage servers employ the method of hashing the address space as part of a caching technique for the storage servers.

18. The method of claim 17 wherein the caching technique further comprises a caching policy selected from a least recently used caching policy, a least frequently used caching policy, a random caching policy, an adaptive replacement caching policy, and a first-in-first-out caching policy.

19. A method of hashing an address space to a plurality of storage servers comprising the steps of:
    dividing the address space by a number of the storage servers to form data segments, each data segment comprising a base address;
    assigning the data segments to the storage servers according to an assignment sequence;
    measuring a load on each of the storage servers, wherein measuring the load on each of the storage servers comprises computing a weighted aggregate of outstanding read and write requests, wherein the load comprises a cumulative load which comprises an aggregate of an instantaneous load taken at time intervals over a time period;

for each of the storage servers, determining whether a data share for the corresponding storage server needs to be decreased or increased to approximately balance the loads on the storage servers in order to identify at least one over-utilized storage server and at least one under-utilized storage server;

for each of the storage servers for which the data share is to be decreased or increased, calculating the decreased or increased data share based on an existing data share for the corresponding storage server and the load of the corresponding storage server; and proceeding through the storage servers according to the assignment sequence and for each over-utilized storage server reassigning a portion of a particular data segment on the over-utilized storage server to at least one sequentially available under-utilized storage server while maintaining the base address of the particular data segment on a corresponding originally assigned storage server.

20. The method of claim 19 further comprising the step of permuting an initial address space to form the address space.

21. The method of claim 19 wherein each data segment further comprises a plurality of data blocks.

22. The method of claim 21 wherein the step of proceeding through the storage servers according to the assignment sequence and for each over-utilized storage server reassigning the portion of the particular data segment to at least one sequentially available under-utilized storage server reassigns first data blocks from a first over-utilized storage server to a first under-utilized storage server.

23. The method of claim 22 wherein the first data blocks comprise an upper end of the particular data segment.

24. The method of claim 23 wherein a remainder of the particular data segment comprises second data blocks and further wherein the second data blocks comprise a particular data block which resides at the base address for the particular data segment.

25. The method of claim 21 wherein the step of proceeding through the storage servers according to the assignment sequence and for each over-utilized storage server reassigning the portion of the particular data segment to at least one sequentially available under-utilized storage server reassigns first data blocks from a first over-utilized storage server to first and second under-utilized storage servers.

26. The method of claim 19 wherein the step of measuring the load on each of the storage servers comprises summing and weighting:
a number of outstanding cache-read requests;
a number of outstanding cache-write requests;
a number of outstanding disk-read requests; and
a number of outstanding disk-write requests.

27. The method of claim 26 wherein the step of measuring the load on each of the storage servers further comprises summing and weighting a number of outstanding time-stamp requests.

28. The method of claim 19 wherein the aggregate of the instantaneous load comprises an averaged sum of an instantaneous load taken at time intervals over the time period.

29. The method of claim 19 wherein calculating the decreased or increased data share comprises:
subtracting a storage server load from an average load, thereby forming a load difference; and
summing the load difference and the existing data share.

30. The method of claim 19 wherein calculating the decreased or increased data share comprises:
subtracting a storage server load from an average load, thereby forming a load difference;
dividing the load difference by a factor, thereby forming a damped load difference; and
summing the damped load difference and the existing data share.

31. The method of claim 19 wherein a coordinator coordinates the steps of:
dividing the address space into the data segments;
sequentially assigning the data segments;
measuring the load on each of the storage servers; and
calculating the decreased or increased data shares assigned to the storage servers.

32. The method of claim 31 wherein the storage servers communicate the loads to the coordinator by appending load information onto messages.

33. The method of claim 31 wherein the storage servers communicate the loads to the coordinator by broadcasting load information.

34. The method of claim 19 wherein the storage servers employ the method of hashing the address space as part of a caching technique for the storage servers.

35. The method of claim 34 wherein the caching technique further comprises a caching policy selected from a least recently used caching policy, a least frequently used caching policy, a random caching policy, and an adaptive replacement caching policy.

36. A non-transitory computer readable storage media comprising computer code that upon execution by a computer is for implementing a method of hashing an address space to a plurality of storage servers, the method of hashing the address space to the plurality of storage servers comprising the steps of:
dividing the address space by a number of the storage servers to form data segments, each data segment comprising a base address;
assigning the data segments to the storage servers;
measuring a load on each of the storage servers, wherein measuring the load on each of the storage servers comprises computing a weighted aggregate of outstanding read and write requests, wherein the load comprises a cumulative load which comprises an aggregate of an instantaneous load taken at time intervals over a time period;
adjusting data shares assigned to the storage servers to approximately balance the loads on the storage servers while maintaining the base address for each data segment on a corresponding originally assigned storage server, wherein adjusting the data share for each of the storage servers comprises calculating an adjusted data share for each of the storage servers based on an existing data share of the corresponding storage server, and on the load of the corresponding storage server; and
moving at least a portion of at least one of the data segments between the storage servers in response to adjusting the data shares.

37. A non-transitory computer readable storage media comprising computer code that upon execution by a computer is for implementing a method of hashing an address space to a plurality of storage servers, the method of hashing the address space to the plurality of storage servers comprising the steps of:
dividing the address space by a number of the storage servers to form data segments, each data segment comprising a base address;
assigning the data segments to the storage servers according to an assignment sequence;

measuring a load on each of the storage servers, wherein measuring the load on each of the storage servers comprises computing a weighted aggregate of outstanding read and write requests, wherein the load comprises a cumulative load which comprises an aggregate of an instantaneous load taken at time intervals over a time period;

for each of the storage servers, determining whether a data share for the corresponding storage server needs to be decreased or increased to approximately balance the loads on the storage servers in order to identify at least one over-utilized storage server and at least one under-utilized storage server;

for each of the storage servers for which the data share is to be decreased or increased, calculating the decreased or increased data share based on an existing data share for the corresponding storage server and the load of the corresponding storage server; and proceeding through the storage servers according to the assignment sequence and for each over-utilized storage server reassigning a portion of a particular data segment on the over-utilized storage server to at least one sequentially available under-utilized storage server while maintaining the base address of the particular data segment on a corresponding originally assigned storage server.

* * * * *